(No Model.) 2 Sheets—Sheet 2.

H. L. SHEPARD.
GEARING.

No. 475,901. Patented May 31, 1892.

Attest:
Henry Appleton
K. Smith

Inventor:
Herbert L. Shepard
per
Wm. Hubbell Fisher
Attorney.

UNITED STATES PATENT OFFICE.

HERBERT L. SHEPARD, OF CINCINNATI, OHIO.

GEARING.

SPECIFICATION forming part of Letters Patent No. 475,901, dated May 31, 1892.

Application filed February 23, 1892. Serial No. 422,401. (No model.)

*To all whom it may concern:*

Be it known that I, HERBERT L. SHEPARD, a citizen of the United States, and a resident of the city of Cincinnati, in the county of Hamilton and State of Ohio, have invented certain new and useful Improvements in Gearing, of which the following is a specification.

One of the principal objects of my invention is to provide means at once novel, practical, simple, cheap of cost, and advantageous of use, whereby a rotating shaft (or pulley) may have its velocity of rotation instantly and conveniently changed.

The several features of my invention and the various advantages resulting from their use, conjointly or otherwise, will be apparent from the following description and claims.

Figure 1:
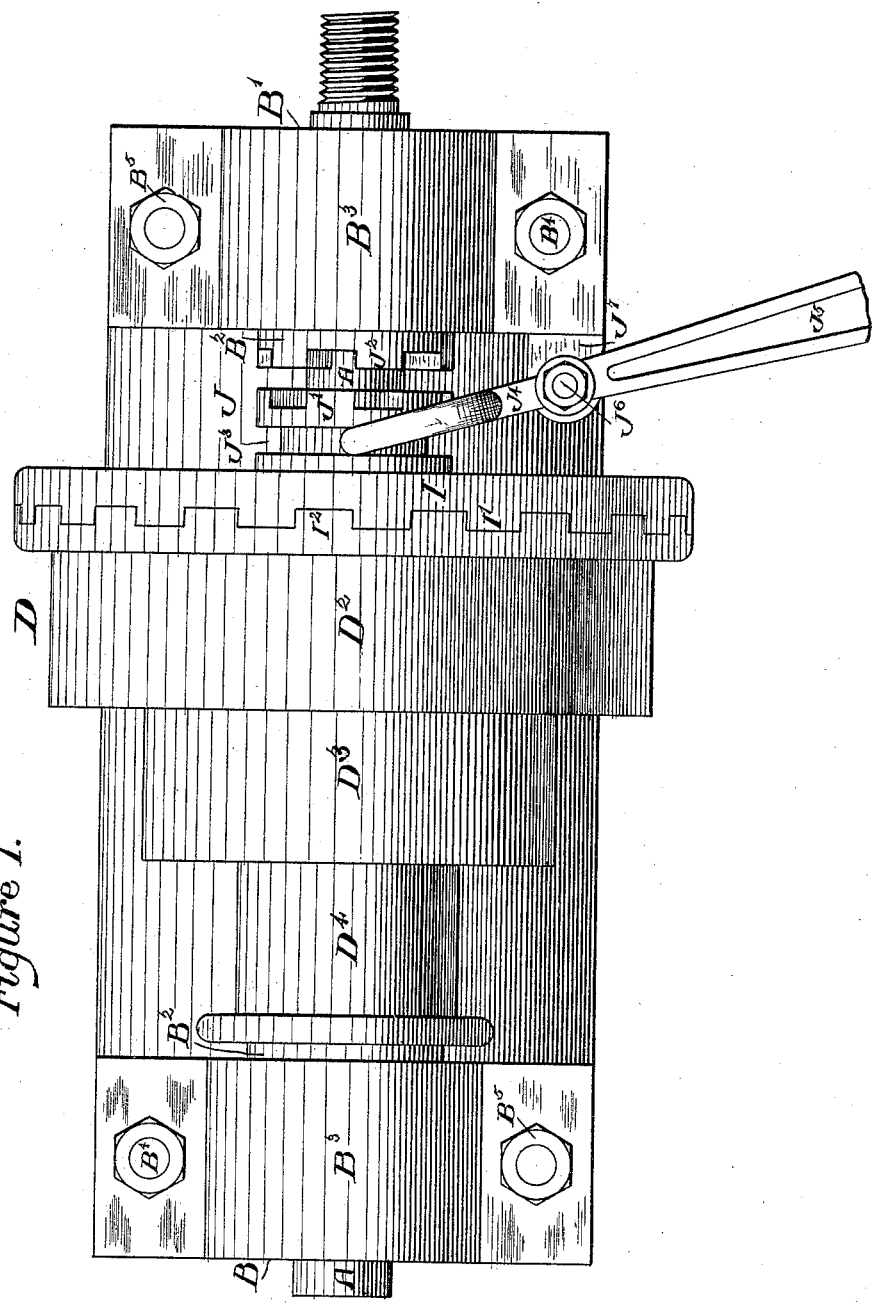
Figure 2:
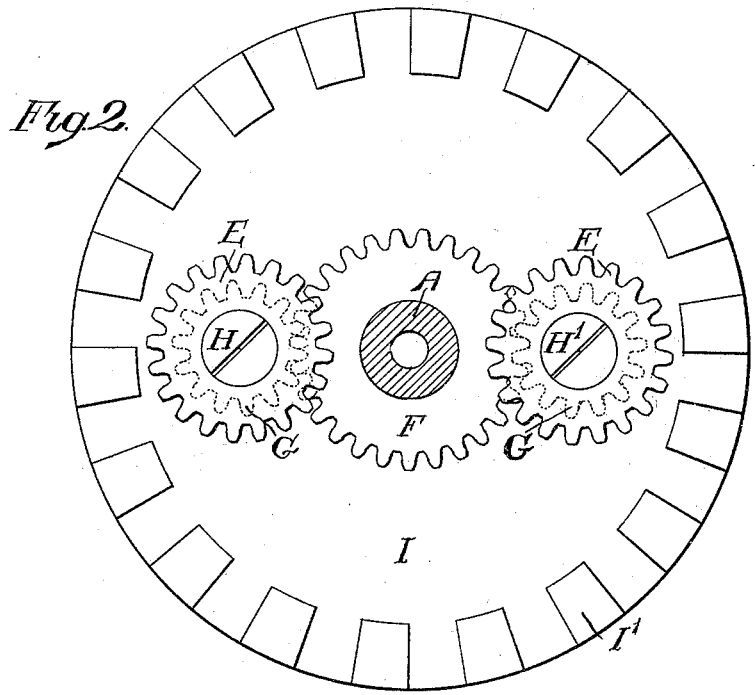
Figure 3:
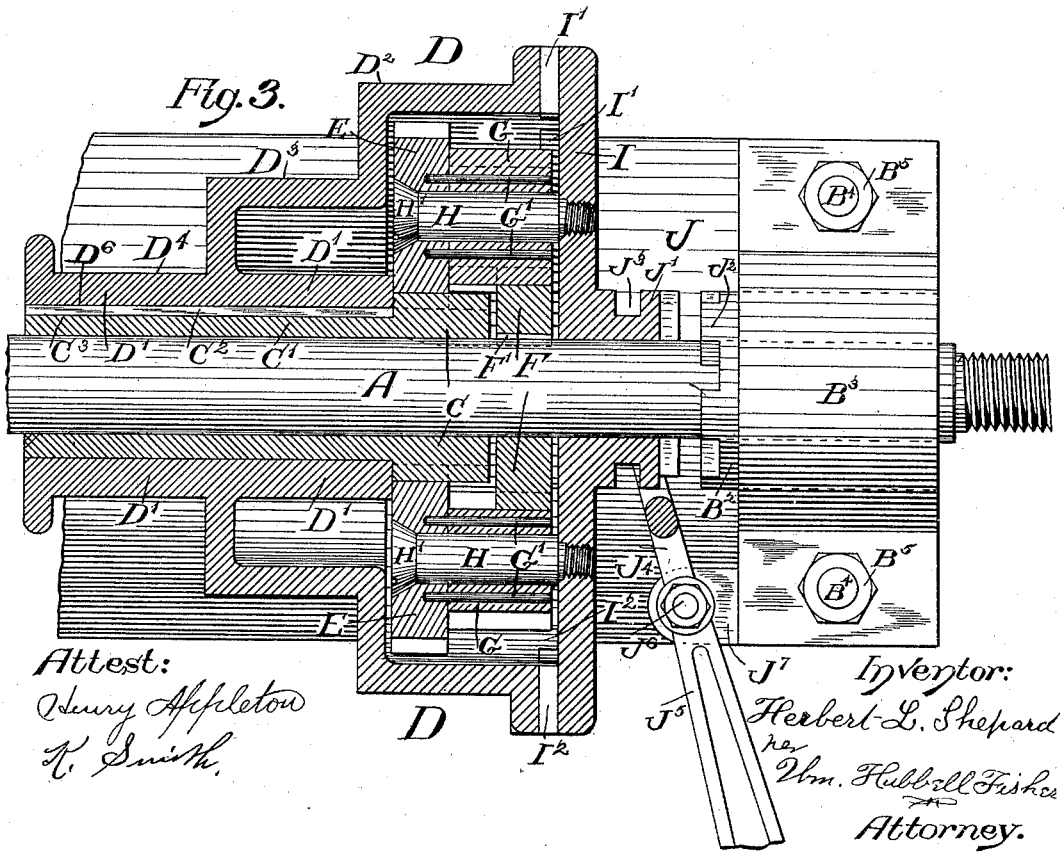

In the accompanying drawings, making a part of this specification, and to which reference is hereby made, Figure 1, Sheet 1, is a top view of mechanism illustrating my invention. Fig. 2, Sheet 2, is a view in elevation of the discal clutch-piece and the gear it carries and showing in section the end of the main shaft on which the said discal clutch is located. The elevation is of that side of the discal piece and of that end of the shaft which faces toward the left hand in Fig. 3. Fig. 3 represents a horizontal longitudinal central section of the device shown in Figs. 1 and 2. In this view it will be observed that certain parts of the mechanism are left in plan, and consequently are sectioned.

A indicates the main shaft. This is the shaft whose rotation is to be accomplished and whose speed of rotation is to be varied by the mechanism hereinafter described. The shaft is supported in suitable bearings located at desired points along its length.

B indicates one of the bearings and B' another. Each bearing is preferably provided with a removable bushing $B^2$, which immediately receives the shaft A. Each bushing is preferably held in the usual manner in place by the well-known box-cover $B^3$, secured to the opposing portion of the bearing by bolts, as $B^4$, and nuts $B^5$.

Upon the shaft A and concentric therewith is the pinion C, carrying the sleeve C'. Around this sleeve and concentric therewith is the hub D' of a pulley D. The extent and conformation of this pulley will be hereinafter described. The sleeve C' and the hub D' are fixedly connected together by the usual adjustable and removable key $C^2$, interfitting the slots $C^3$ and $D^6$, respectively present in said sleeve and hub, or by other suitable means. To the right of the pinion C is a pinion F, fixed on the shaft A by a key or feather. In the present instance a key F' is used, located in a slot in the shaft A and in a slot in the pinion F. To the right of the pinion F is a discal piece I, located on the shaft so as to revolve freely thereon and concentric therewith. Fixed to this discal piece I is a piece J', constituting the one half or complementary part of a clutch J. The other half or opposing portion $J^2$ of this clutch is fixed to some stationary portion of the machine or other stationary object. Where my invention is applied to lathes, a convenient place for the location of this last-named part is the bushing $B^2$, and in the present illustrative instance this part $J^2$ is integral with the said bushing or box $B^2$.

The discal piece I and its clutch-piece J' slide upon the main shaft, thus permitting the said sliding portion I and J' to be moved toward the clutch-piece $J^2$, so that the latter may engage the clutch-piece J'.

One description of suitable means for moving the clutch is shown and consists of the well-known lever $J^4$ $J^5$, pivotally fulcrumed at $J^6$ to a stationary support $J^7$. The forward portion $J^4$ of the lever carries lugs fitting into the groove $J^3$ of the clutch-piece J'. These lugs allow of a free rotation of the clutch-piece J, but compel the latter, with discal piece I, to slide along the shaft as the forward portion $J^4$ of the lever is moved by the operator actuating the handle $J^5$. The discal piece carries spindles or shafts H. Upon each of these spindles or shafts is a toothed wheel G and also a toothed wheel E. These wheels G and E are fixed so as to rotate together, and constitute what may be termed a "compound pinion." The teeth of each wheel G mesh with the teeth of the shaft-pinion F, and each of the pinions E with the pulley-pinion C. A preferred mode of uniting each wheel G to its respective wheel E is, as shown in Fig. 3, by pins or rods G'. The periphery of the pulley D extends over and, in connection with the discal plate I, incloses the aforementioned gears. That end or edge of the periphery of the pulley which is next to the discal piece I is provided with clutch-teeth $I^2$. Opposite these teeth are complementary clutch-teeth I', fixed on the adjacent side of the discal piece I. Thus when the latter is moved toward the pulley the teeth I' will engage the teeth $I^2$ and the pulley D and the discal piece I will constitute one piece, so far as rotations are concerned.

In order to enable the discal piece I and the gear it carries to be moved to and from the pulley and yet retain the said gear of the disk in engagement with the shaft-pinion F and pulley-pinion C, as aforesaid, the pinions G are made longer than pinion F and pinion C longer than pinions E, substantially as shown. It will be observed that pinion F is of a much greater diameter than the pinions G. The diameter of pinion E relative to pinion C may be varied according to the rate of speed required of shaft A. When it is desired to increase the power, the pinion E is made larger than pinion C.

The mode in which the aforedescribed mechanism rotates is as follows: Power being applied to the pulley D, the latter is thereby rotated at a given speed. When it is desired that the main shaft A shall rotate at the same speed as the pulley D, the discal clutch-plate I is moved toward the pulley, so that its clutch-teeth $I^2$ engage the clutch-teeth of the pulley. The discal plate I will then rotate as one with the pulley, and consequently at the same speed as the latter. The rotation of the pulley will be communicated to the main shaft through the agency of the gear G and shaft-pinion F, the discal plate carrying the gear G around the shaft A, and the gear G, meshing with pinion F, rotate the latter. As the shaft is fixed to the said pinions, it rotates therewith.

It may be here remarked that in order to accomplish the above-named rotation the gears G should for the time being be rendered non-rotatable. They are made non-rotatable by being fixed to the pinion-wheels E. As the latter mesh with the pinion C, fixed to the pulley and revolve therewith, and the said pinion revolves around the shaft at the same rate of speed as do the spindles of the compound pinions E G E G, no opportunity is afforded for the said compound pinions to turn upon their spindles, and hence the shaft A rotates at the same speed as the pulley D.

When it is desired to diminish the speed at which the shaft A rotates and at the same time increase the power with which pulley D rotates, the discal plate is moved away from the pulley, and thus unclutched therefrom, and its clutch-piece J' is moved into engagement with the clutch-piece $J^2$. The discal plate I and the spindles H are thus made stationary. As the pulley continues to revolve it rotates the pinion C, fixed to it, and the latter rotates the compound pinions E G E G, and these in turn rotate the shaft-pinion F, which rotates the main shaft A. By reason of the said different diameters of the intermeshing pinions aforementioned the speed of rotation of the main shaft A will be much less than the speed at which the pulley D revolves. The exact rate of speed at which under such circumstances the shaft A shall revolve in relation to the speed of rotation of the pulley can be arranged for and determined by making the various pinions of said gear of the proper diameters and the requisite number of teeth, according to formulated and well-known rules.

It may be here remarked that a convenient mode of connecting the spindles H to the discal plate is by a screw-thread formed on the end of the spindle, engaging a female screw in the discal plate. Where the heads of the spindles H are beveled and this beveled portion fits into a countersunk portion of the compound pinion surrounding the hole in the latter through which passes the spindle, the heads of the spindles will not project outside of the adjacent face of the pinion, and hence great compactness of construction and economy of room will be obtained.

In the illustration I have shown a cone-pulley with three speeds; but the pulley may have a single speed or any number of speeds, as desired.

While the various features of my invention are preferably employed together, one or more of the said features may be used without the remainder, and in so far as applicable one or more of said features may be employed in connection with mechanism other than that especially appropriate for lathes.

What I claim as new and of my invention, and desire to secure by Letters Patent, is—

1. The main shaft, a loose pulley thereon carrying the pinion C, concentric with the shaft A, and the discal piece or plate I, compound pinion E G, pivotally attached to said plate I, and the pinion F, fixed to shaft A and meshing with pinion G, and the pinion C, meshing with the pinion E, the discal piece being movable along shaft A and provided with means for engaging pulley D when moved to it and also with means for engaging a stationary clutch-piece when moved toward the latter and away from the pulley, substantially as and for the purposes specified.

2. A main shaft, an operating-pulley thereon, and pinion C, fixed to the pulley and concentric on said shaft, discal piece I and planet-gear connected thereto, and shaft-gear F, the latter and pinion C engaging the planet-gear, substantially as described, clutch-teeth $I^2$ on pulley D and clutch-teeth I' on discal plate I for mutual engagement, the discal piece sliding on the shaft A, clutch-teeth I' on the piece J', and stationary clutch-teeth $J^2$ for enabling the discal piece when unclutched from the pulley to engage the stationary clutch-piece and remain stationary while the pulley revolves, substantially as and for the purposes specified.

3. A hollow pulley and pinion C therein and fixed to the pulley, shaft A, on which the pulley D freely revolves, pinion F, fixed on the shaft, discal piece I, and planet-gear pinions G E G E, respectively engaging the pinions C F and carried by said discal piece I, the periphery of the pulley being extended around the planet-gear and the piece I and said pulley being provided with the complementary parts of the clutch, the discal piece having, also, a clutch portion, the complementary part of such clutch being attached to a stationary part of the device, substantially as and for the purposes specified.

4. A hollow pulley and pinion C therein and fixed to the pulley, shaft A, on which the pulley D freely revolves, pinion F, fixed on the shaft, discal piece I, and planet-gear pinions G E G E, respectively engaging the pinions C F and carried by said discal piece I, the periphery of the pulley being extended around the planet-gear and the piece I and said pulley being provided with the complementary parts of a clutch, the discal piece having, also, a clutch portion, and the journal-bearing $B^3$ and the bushing $B^2$, and the complementary portion of the last-named clutch being fixed to the said bushing, substantially as and for the purposes specified.

5. A hollow pulley and pinion C therein and fixed to the pulley, shaft A, on which the pulley D freely revolves, pinion F, fixed on the shaft, discal piece I, and planet-gear pinions G E G E, respectively engaging the pinions C F and carried by said discal piece I, the periphery of the pulley being extended around the planet-gear, and the clutch-teeth $I^2$, located on its peripheral edge, the discal piece I carrying the clutch-teeth I' for engagement with the clutch-teeth $I^2$ and also having clutch-teeth J' for engagement with the stationary clutch-teeth $J^2$, substantially as and for the purposes specified.

6. The shaft A and the sleeve C', attached to pinion C, concentric with and freely turning on said shaft, and the hollow pulley fixed to said sleeve, and pinion F, concentric with and fixed to said shaft, and piece I, revolving freely on shaft A and carrying the planet-gear G E, respectively engaging the pinions C and F, a clutch adapted for enabling the pulley and the piece I to be engaged, and a clutch portion on the latter piece, and a complementary clutch portion on a fixed piece of the supporting-frame for enabling the discal piece I when disengaged from the pulley to be rendered stationary, substantially as and for the purposes specified.

7. A shaft fitted for rotation, a pulley and pinion constructed for united rotation on said shaft, a pinion fixed to said shaft, a piece separate from said pulley, constructed for rotation on said shaft, and planet-gear pinions E and G, carried by said piece and respectively engaging the pulley-pinion and shaft-pinion, and one clutch for enabling the pulley to be engaged with the piece I and another clutch for enabling the piece I when disengaged from the pulley to be fixed in a stationary position, substantially as and for the purposes specified.

8. A shaft fitted for rotation, a pulley and pinion constructed for united rotation on said shaft, a pinion fixed to said shaft, a piece separate from said pulley, constructed for rotation on said shaft, and planet-gear pinions E and G, carried by said piece and respectively engaging the pulley-pinion and shaft-pinion, and one clutch for enabling the pulley to be engaged with the piece I and another clutch for enabling the piece I when disengaged from the pulley to be fixed in a stationary position, the pinion C being of a length greater than pinion E and the pinion G being of greater length than the pinion F, substantially as and for the purposes specified.

HERBERT L. SHEPARD.

Attest:
CHAS. E. EVERETT,
MAX SIEREVELD.